United States Patent
Kohl et al.

(10) Patent No.: US 8,362,123 B2
(45) Date of Patent: Jan. 29, 2013

(54) SOLIDIFYING ADHESIVES HAVING SILANE CROSS-LINKING

(75) Inventors: Matthias Kohl, Weinheim (DE); Manfred Proebster, Nuβloch (DE); Sandra Foncillas, Sandhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/240,237

(22) Filed: Sep. 22, 2011

(65) Prior Publication Data

US 2012/0040191 A1 Feb. 16, 2012

Related U.S. Application Data

(63) Continuation of application No. PCT/EP2010/051096, filed on Jan. 29, 2010.

(30) Foreign Application Priority Data

Mar. 24, 2009 (DE) .......... 10 2009 001 771

(51) Int. Cl.
*C09J 177/00* (2006.01)
*C09J 133/08* (2006.01)
*C09J 167/00* (2006.01)

(52) U.S. Cl. ........ 524/266; 524/265; 524/267; 524/268; 428/350; 428/355 CN; 428/429

(58) Field of Classification Search ................ 428/350, 428/355 CN, 429; 524/265, 266, 267, 268
See application file for complete search history.

(56) References Cited

U.S. PATENT DOCUMENTS

| 4,222,925 | A | 9/1980 | Bryant et al. | |
|---|---|---|---|---|
| 6,649,016 | B2* | 11/2003 | Wu et al. | 156/329 |
| 7,211,616 | B2* | 5/2007 | Kaszubski et al. | 524/493 |
| 7,332,541 | B2 | 2/2008 | Schindler et al. | |
| 2005/0107499 | A1* | 5/2005 | Georgeau et al. | 524/59 |
| 2009/0306283 | A1 | 12/2009 | Kohl | |
| 2010/0204387 | A1 | 8/2010 | Zander et al. | |
| 2010/0331480 | A1 | 12/2010 | Wrubbel et al. | |
| 2011/0086984 | A1 | 4/2011 | Balk et al. | |

FOREIGN PATENT DOCUMENTS

| DE | 10132678 | 2/2002 |
|---|---|---|
| DE | 10237271 | 3/2004 |
| DE | 102006059473 | 6/2008 |
| DE | 102007038030 | 2/2009 |
| DE | 102008003743 | 7/2009 |
| DE | 102008002016 | 12/2009 |
| EP | 1303569 | 7/2011 |

OTHER PUBLICATIONS

MSDS of Pyrolen 100 from Megaloid Laboratories Lt.*
International Search Report issued in connection with International Patent Application No. PCT/EP2010/051096 dated Jun. 10, 2010.
EN ISO 2555.
DIN ISO 4625.
ASTM E2867, Ring & Ball.

* cited by examiner

*Primary Examiner* — Vu A Nguyen
(74) *Attorney, Agent, or Firm* — James E. Piotrowski; Steven C. Bauman

(57) ABSTRACT

A one-component moisture-curing adhesive containing at least one flowable polyoxyalkylene or polyacrylate prepolymer with at least one hydrolyzable silane group, at least one inert additive solid at room temperature selected from hydrocarbon resins, polyesters or polyamides with a softening point of 40 to 150° C., together with auxiliary substances and additives.

10 Claims, No Drawings

SOLIDIFYING ADHESIVES HAVING SILANE CROSS-LINKING

The invention relates to one-component adhesives solid at room temperature and flowably applicable on heating, based on silane-functionalized prepolymers together with thermoplastic binders, which are suitable as moisture crosslinking adhesives and sealants for adhesively bonding components.

Moisture-curing resilient adhesives and sealants are used widely in industry. It is here desirable for said adhesive bonding to be feasible on different substrates without pretreatment having to be carried out using a primer or using physical methods, such as corona treatment or plasma treatment. Such adhesives and sealants based on reactive polyurethane prepolymers are known. Arising from the manufacture thereof, these often still contain small proportions of monomeric isocyanates. That is harmful to health, however, in particular during processing. It has additionally been demonstrated that PU-based adhesives do not meet requirements for UV stability or weathering resistance on exposure to light and normal weather.

Moreover, sealant compositions are known which comprise a polymer backbone based on polymers of different composition, which additionally contain moisture-crosslinkable silane groups. For example, U.S. Pat. No. 4,222,925 A describes a sealing composition containing a mixture of a polyurethane prepolymer, which contains alkoxysilane groups in the chain, and small proportions of γ-aminopropyltrimethoxysilane. Fillers and other additives may additionally be included.

DE 10237271 describes polymer compositions which contain alkoxysilane-terminated polymers. Acids, bases, organic metal compounds or organic amino compounds may additionally be included as catalysts. The polymer composition may additionally contain plasticizers or fillers.

EP 1303569 describes polymers which bear at least two Si(OR) groups on a polymer backbone. The binders may be used in adhesives, paints or foam precursors. The adhesives are not described in any greater detail.

DE 102006059473 is additionally known. It describes one-component adhesive and sealant compositions, which consist of a silane-functional polyoxyalkylene prepolymer and a silane-functional polyolefin. Various additives are added to this composition, for example nonpolar plasticizers and known tackifying resins.

DE 10 2008 003 743 describes mixtures of polymers containing crosslinkable silane groups. Various additives are described. The preparations are intended to have a viscosity of below 80,000 mPa·s.

Adhesives according to the known prior art have the disadvantage that their mechanical properties are often inadequate. Resilience is often not good, in particular if a high crosslink density of the sealant is obtained. If the crosslink density is lower, a material is often obtained which is too soft or which creeps on heating. Furthermore, such sealants have the characteristic of being readily applicable at room temperature but of requiring additional holding devices prior to chemical crosslinking to achieve a stable bond between the substrates. The initial strength obtained does not provide sufficient mechanical stability for further processing.

The object of the present invention is therefore to provide an adhesive which is readily applicable at slightly elevated temperatures and which, after cooling to room temperature, gives rise to a temporary mechanically stable bond between the two substrates. The substrates can then be further processed or transported without the substrates slipping or separating. Furthermore, after crosslinking, these adhesives are intended to provide a firmly adhering, resilient bond between the substrates. A further object of the present invention is for these adhesives and sealants to be applicable to the various substrates without a primer and to result in good adhesion. It is intended to prevent exudation of constituents and weakening of the substrate/adhesive bond.

The object is achieved by a one-component moisture-curing adhesive containing at least one flowable polyoxyalkylene and/or polyacrylate prepolymer with at least one hydrolyzable silane group, at least one inert additive solid at room temperature selected from hydrocarbon resins, polyesters or polyamides with a softening point of 40 to 150° C., together with auxiliary substances and additives.

For the purposes of the present invention polyoxyalkylene prepolymers with at least one hydrolyzable silane group are those prepolymers based on polyethers which comprise hydrolyzable silane groups. These silane-containing prepolymers based on polyethers may in principle be produced in various ways.

The polymer backbone is synthesized on the basis of polyoxyalkylene chains. The chains may bear functional groups at the chain ends, which are then converted into silane groups by further reaction. Polyether polyols are suitable as the starting polymer, for example.

Polyoxyalkylene polyols are used as polyols for the compositions according to the invention. These may be known polyether polyols based on polyethylene oxide, polypropylene oxide or poly-THF, it also being possible to use mixtures with different building blocks. Di- or trifunctional polyether polyols based on polypropylene glycol are particularly suitable. Such polyols are known to a person skilled in the art.

According to the invention, mixtures of a plurality of polyether polyols with various molecular weights may likewise be used. Such polyols may then be functionalized with silane groups.

For example, hydroxy-functional polyethers are reacted with unsaturated chlorine compounds, for example allyl chloride, by ether synthesis to yield polyethers with terminal olefinic double bonds, which are in turn reacted with hydrosilane compounds, which have hydrolyzable groups, such as for example $HSi(OCH_3)_3$, in a hydrosilylation reaction under the catalytic influence of for example group 8 transition metal compounds to yield silane-terminated polyethers.

In another method, polyethers containing olefinically unsaturated groups are reacted with a mercaptosilane such as for example 3-mercapto-propyltrialkoxysilane.

In a further method, first of all OH-containing polyethers are reacted with di- or polyisocyanates in excess, which are then reacted with amino-functional, hydroxy-functional or mercapto-functional silanes to yield silane-terminated prepolymers. Suitable isocyanates are in particular the known aliphatic or aromatic diisocyanates, such as 1,6-hexamethylene diisocyanate (HDI), 1-isocyanato-3,3,5-trimethyl-5-isocyanatomethylcyclohexane (IPDI), xylylene diisocyanate (XDI), tetramethylxylylene diisocyanate (TMXDI), 2,4- or 2,6-tolylene diisocyanate (TDI), 2,4'-diphenylmethane diisocyanate, 2,2'-diphenylmethane diisocyanate or 4,4'-diphenylmethane diisocyanate (MDI) and the isomer mixtures thereof. The quantity is selected such that an NCO-terminated prepolymer is obtained. These reaction products are then further reacted with silanes, which comprise hydrolyzable groups and a group reacting with NCO groups.

A further option is to react hydroxy-functional polyethers with isocyanato-functional silanes. The selection of silanes, methods and reaction conditions are known to a person skilled in the art.

The at least one silane group should contain hydrolyzable residues. Examples of such residues are —Cl, —O—C(=O) $R^1$, —$OR^1$, in which $R^1$ denotes a hydrocarbon residue with 1 to 20 C atoms. $C_1$ to $C_6$ alcohol residues or $C_2$ and $C_3$ carboxylic acid residues are preferred. These residues may be present on the silicon atom either individually or mixed. The number of these residues should be one to three, in particular two or three. Tri- or dialkoxysilane groups with methoxy, ethoxy, propoxy or butoxy groups are suitable, for example. In addition, 0, 1 or 2 alkyl groups may also be present on the silicon atom, in particular methyl, ethyl, propyl or butyl groups. Furthermore, a further group reactive with the OH groups or NCO groups must be present. This further functional group is attached by reaction to the silane by an aliphatic alkyl residue, for example by $C_2$ to $C_6$ alkyl. In this case the functional group may for example be terminal relative to the alkyl group or the latter is in a position relative to the silane. Examples of silanes containing nucleophilic substituents are 3-mercaptopropyltrimethoxysilane, 3-aminopropyltrimethoxysilane, N-(2-aminoethyl)-3-aminopropyltrimethoxysilane or N-(2-aminoethyl)-3-aminopropylmethyldiethoxysilane, corresponding ethoxy- or propoxysilanes and the analogous alkyldialkoxysilanes, for example methyl-, ethyl- or butyldialkoxysilane. Examples of silanes containing NCO groups are trimethoxysilylpropyl isocyanate, trimethoxysilylpentyl isocyanate, trimethoxysilylbutyl isocyanate and corresponding ethoxy- or propoxysilanes, or analogous methyldialkoxy-substituted silanes. Silanes with mixed alkoxy groups are also suitable.

The number of silane groups must amount to at least one per molecule, in particular however two to four groups are present. In one particular embodiment the silane groups are terminal relative to the polyether chain.

Polyethers suitable according to the invention, which comprise a sufficient number of silane groups, are commercially obtainable with different molecular weights or chain structures.

The reactive polyoxyalkylene prepolymers are conventionally highly viscous at room temperature (25° C.), with their viscosity possibly amounting to from 5000 to 100,000 mPa·s (measured to Brookfield, EN ISO 2555).

Another embodiment of the composition according to the invention uses polyacrylate-based prepolymers which likewise comprise at least one hydrolyzable silane group in the polymer chain. Polyacrylate polymers should be understood for the purposes of the present invention also to include methacrylate polymers and copolymers. It is likewise possible to use mixed block copolymers of polyethers and polyacrylates.

The poly(meth)acrylates suitable according to the invention are polymerization products of one or more alkyl(meth) acrylate esters with 1 to 12 C atoms in the alcohol residue. Small proportions of (meth)acrylic acid or other copolymerizable monomers, for example styrene, vinyl esters or acrylamides may optionally also be present. $C_1$ to $C_8$ (meth)acrylate esters are particularly suitable. Such polymers are known to a person skilled in the art and may be produced in various ways. They are likewise commercially obtainable in various chemical compositions.

Acrylate copolymers suitable according to the invention should comprise at least one, preferably two, in particular between 2 and 5 hydrolyzable silane groups. These silane groups comprise the above-mentioned silane groups with hydrolyzable residues. In this case too, di- or trialkoxysilane groups with $C_1$ to $C_4$ alkoxy groups are particularly preferred.

The silanes may be attached to the polymer parent structure using various production methods. It is for example possible to incorporate silanes containing an unsaturated residue and hydrolyzable groups by polymerization. In this case the silane groups are then distributed randomly over the polymer chain.

In another mode of operation acrylate polymers with unsaturated groups are produced, the unsaturated double bonds then being reacted with silanes. In this case it is also possible to obtain such unsaturated groups and thus the silane groups terminally on the acrylate copolymer.

In a further mode of operation, acrylate polymers containing OH groups are produced. These may then be reacted directly with isocyanatosilanes, or they are reacted with an excess of diisocyanates, the unreacted isocyanate groups subsequently being reacted with silanes additionally containing nucleophilic groups. Suitable silanes have already been listed further above.

Another embodiment of the invention uses acrylate block copolymers, which likewise comprise hydrolyzable silane groups. Such polymers are described for example in DE 10 2008 002 016.

Poly(meth)acrylate copolymers with one or more reactive silane groups are also commercially obtainable.

In a preferred embodiment of the composition according to the invention, the molecular weight (number-average molecular weight, $M_N$, determinable by GPC) of the acrylate or polyether polymers amounts to between 1500 and 75,000 g/mol. Further particularly preferred molecular weight ranges are 2000 to 50,000 g/mol, with 3000 to 30,000 g/mol being very particularly preferred. These molecular weights are particularly advantageous, since compositions with these molecular weights exhibit viscosities which allow good processability. Very particularly preferably used polymers are those which exhibit a polydispersity D (measured as $M_W/M_N$) of less than 2, preferably of less than 1.5, in particular of less than 1.2.

It is also feasible to use polymers with a higher molecular weight. If the viscosity of the composition according to the invention is higher than desired, due for example to a high molecular weight or strong internal bonding forces, the processing viscosity may be adjusted by adding reactive diluents or plasticizers, so producing a preparation which exhibits the desired characteristics.

It is possible to use the silane-containing polymers based on polyethers or polyacrylates individually, or also as a mixture of differing composition or molecular weight. The compatibility of the polymers must in this case also be taken into consideration. Compatibility may be influenced by way of the polymers themselves, for example acrylates with contents of longer-chain alkyl acrylates as monomer constituent exhibit more highly non-polar characteristics.

At least one inert additive with a softening point of 40 to 150° C. (measured to DIN ISO 4625) is present as a further component which is necessary according to the invention. This component should be solid at room temperature. It may be melted, setting again rapidly thereafter on cooling. This component may consist of solid polyesters, solid polyamides and/or solid hydrocarbon resins, which may be present as polymers or oligomers. It is possible for this additive also to contain functional groups, but those inert polymers should be selected which do not comprise any groups reactive with the silane groups of the polymers, in particular no silane groups.

Examples of additives according to the invention are polyesters, and polyester polyols, with a molecular weight of around 500 to around 10,000 g/mol. Polyesters may be used in this case which are obtained by reacting low molecular weight alcohols, in particular ethylene glycol, diethylene glycol, neopentyl glycol, hexanediol, butanediol, propylene glycol, glycerol or trimethylolpropane with caprolactone. Also suitable as polyfunctional alcohols for producing polyesters are 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol.

Suitable polyesters may be produced by polycondensation. Difunctional and/or trifunctional alcohols may accordingly be condensed with a deficit of dicarboxylic acids and/or tricarboxylic acids or the reactive derivatives thereof to form polyester polyols. Suitable dicarboxylic acids are for example succinic acid and the higher homologs thereof with up to 16 C atoms, as are furthermore unsaturated dicarboxylic acids such as maleic acid or fumaric acid and aromatic dicarboxylic acids, in particular the isomeric phthalic acids, such as phthalic acid, isophthalic acid or terephthalic acid. Citric acid or trimellitic acid are, for example, suitable as tricarboxylic acids. Particularly suitable alcohols are hexanediol, ethylene glycol, diethylene glycol or neopentyl glycol or mixtures of two or more thereof. Particularly suitable acids are isophthalic acid or adipic acid or a mixture thereof.

The polyesters may comprise OH groups in terminal position, and they may also contain carboxyl groups. The polyesters may be linear, but it is also possible to use branched polyesters. There may be just one polymer, or mixtures of polymers differing in composition or molecular weight may also be used. The softening temperature may be influenced by the selection of the constituents. Aromatic proportions accordingly raise the softening temperature, while branched or aliphatic constituents lower the softening point. Crystalline polyesters are preferred.

Another class of additives solid at room temperature which are suitable according to the invention are hydrocarbon resins. These are natural, optionally also modified, or synthetic polymers. Synthetic resins are obtained in general by polymerization or polycondensation, while natural resins may be isolated and produced from natural products. It is here also possible for them to be modified in their physical form by chemical reactions. Examples of such binders are pentadiene, terpene, coumarone/indene, furan resins, aliphatic or alicyclic petroleum hydrocarbon resins and hydrogenated derivatives, styrene copolymer resins or resins based on functional hydrocarbon resins. These may be used individually or as a mixture.

Polyamides may furthermore be used as the solid additives. Such polyamides may for example be produced by reacting primary diamines with dicarboxylic acids. In this case, the dicarboxylic acids are preferably used in up to 10% stoichiometric excess relative to the diamines, such that carboxyl-terminated polyamides are obtained.

Suitable dicarboxylic acids are for example $C_2$-$C_{14}$ dicarboxylic acids or indeed dimer or polymer fatty acids, which may be produced in known manner by dimerization of unsaturated, long-chain fatty acids obtained from natural raw materials and then further purified by distillation. Examples of dicarboxylic acids are in particular succinic acid, glutaric acid, adipic acid, pimelic acid, suberic acid, azelaic acid, sebacic acid, undecanedioic acid or dodecanedioic acid or also aromatic dicarboxylic acids, such as for example terephthalic acid, as well as mixtures of the above-stated dicarboxylic acids. In particular, however, polyamides are suitable which consist at least of more than 50% dimer fatty acids, in particular only of dimer fatty acids.

The amine component substantially consists of one or more aliphatic diamines, preferably with an even number of carbon atoms, the amino groups being at the ends of the carbon chains. The aliphatic diamines may contain 2 to 20 carbon atoms, the aliphatic chain possibly being linear or slightly branched. The amine component may additionally contain cyclic diamines or polyoxyalkylene diamines, such as for example polyoxyethylene diamines, polyoxypropylene diamines or bis-(di-aminopropyl)-polytetrahydrofuran.

The hardness and melting point of the polyamides may be influenced by the selection of the amine component. Such polyamides are known to a person skilled in the art and are commercially obtainable. They are for example amides meltable at temperatures of below 200° C., in particular based on fatty acids; polyamide waxes or micronized polyamides may also be selected. The softening point of the additives should lie between 40 and 150° C. (measured to ASTM E2867, ring & ball). In particular, the softening point should amount to between 60 and 150° C., particularly preferably to over 70° C. Since the stated additives are polymers, the latter generally contain constituents with different molecular weights. For this reason, in practice the softening point is not stated as a point value, but rather as a softening range. Softening and melting of the component can then be observed within this value range. It has become clear that the softening range of the additive needs to be narrow, i.e. the additive should melt within a narrow temperature range. In this respect, the softening range should amount to less than +/−15° C., in particular less than +/−7° C., in particular +/−3° C. If the softening range is too wide, the composition set and solidify rapidly, meaning that sufficient initial strength cannot be achieved.

The quantity of solid additives should amount to from 0.1 to 20 wt. %, in particular from 0.5 to 10 wt. %, relative to the adhesive. Individual additives may be used or also mixtures. It is advantageous for the additives to be finely dispersed in the adhesive.

The adhesive according to the invention may furthermore optionally contain auxiliary substances and additives. These may for example be plasticizers, stabilizers, antioxidants, fillers, diluents or reactive diluents, dryers, coupling agents and UV stabilizers, fungicides, flame retardants, catalysts, pigments, rheological auxiliaries, coloring pigments or coloring pastes.

Examples of suitable liquid plasticizers are white oils, naphthenic mineral oils, polypropylene, polybutene or polyisoprene oligomers, hydrogenated polyisoprene and/or polybutadiene oligomers, benzoate esters, phthalates, adipates, vegetable or animal oils and the derivatives thereof. Hydrogenated plasticizers are selected for example from the group of paraffinic hydrocarbon oils. Polypropylene glycol and polybutylene glycol are suitable, as is polymethylene glycol. Esters are optionally also used as plasticizers, for example liquid polyesters and glycerol esters or plasticizers based on aromatic dicarboxylic acid esters. Alkylmonoamines and fatty acids with preferably 8 to 36 C atoms may also be suitable.

Examples of plasticizers are adipic acid esters, azelaic acid esters, benzoic acid esters, butyric acid esters, acetic acid esters, esters of higher fatty acids, esters of fatty acids bearing OH groups or of epoxidized fatty acids, fatty acid esters and fats, glycolic acid esters, phosphoric acid esters, phthalic acid esters, linear or branched alcohols containing from 1 to 12 C atoms, propionic acid esters, sebacic acid esters, sulfonic acid esters, thiobutyric acid esters, trimellitic acid esters, citric acid esters and nitrocellulose- and polyvinyl acetate-based esters, as well as mixtures of two or more thereof.

Examples of suitable phthalic acid esters are dioctyl phthalate (DOP), dibutyl phthalate, diisoundecyl phthalate (DIUP) or butylbenzyl phthalate (BBP), while examples of suitable adipates are dioctyl adipate (DOA), diisodecyl adipate, diisodecyl succinate, dibutyl sebacate or butyl oleate. End group-terminated polyethylene glycols are also suitable as plasticizers, for example polyethylene or polypropylene glycol di-$C_{1-4}$-alkyl ethers, in particular the dimethyl or diethyl ethers of diethylene glycol or dipropylene glycol, and mixtures of two or more thereof.

A further class of plasticizers which may preferably be used are those based on sulfonic acid esters or amides. These may comprise esters of alkylated sulfonic acids; such as aromatic sulfonic acids.

The content of plasticizer in the adhesive may be between 0 and 40, in particular there may also be no plasticizer or between 0.5 and 20 wt. % relative to the total composition. Preferred plasticizers are those which comprise polar groups, such as ester, hydroxy, amide or ethylene glycol groups. Suitable plasticizers are known to a person skilled in the art and are commercially obtainable.

"Stabilizers" should be understood for the purposes of the present invention to mean antioxidants, UV stabilizers or hydrolysis stabilizers. Examples of these are the conventional commercial sterically hindered phenols and/or thioethers and/or substituted benzotriazoles and/or amines of the "HALS" (Hindered Amine Light Stabilizer) type. It is preferred for the purposes of the present invention for a UV stabilizer to be used which bears a silyl group and is incorporated into the final product during crosslinking or curing. Benzotriazoles, benzophenone, benzoates, cyanoacrylates, acrylates, sterically hindered phenols, phosphorus and/or sulfur may additionally also be added. The preparation according to the invention may contain up to about 3 wt. %, preferably about 2 wt. % of stabilizers.

All known compounds which are capable of catalyzing hydrolytic cleavage of the hydrolyzable groups of the silane groupings and subsequent condensation of the Si—OH group to yield siloxane groupings (crosslinking reaction or coupling function) may be used as catalysts. Examples are titanates, such as tetrabutyl titanate or titanium tetraacetylacetonate; bismuth compounds, such as bismuth tris-2-ethyl hexanoate; tin carboxylates, such as dibutyltin dilaurate (DBTL), dibutyltin diacetate or dibutyltin diethylhexanoate; tin oxides such as dibutyltin oxide and dioctyltin oxide; organoaluminum compounds such as aluminum trisacetylacetonate; chelate compounds such as zirconium tetraacetylacetonate; amine compounds or the salts thereof with carboxylic acids, such as octylamine, cyclohexylamine, benzylamine, dibutylamine, monoethanolamine, triethanolamine, diethylenetriamine, triethylenetetramine, triethylenediamine, guanidine, morpholine, N-methylmorpholine and 1,8-diazabicyclo-(5,4,0)-undecene-7 (DBU), silane coupling agent with amino groups. One embodiment proceeds without a metal catalyst, another uses the catalyst, preferably mixtures of several catalysts, in an amount from 0.01 to around 5 wt. % relative to the total weight. Quantities of from 0.1 to 4 wt. % are preferred, with less than 0.4 to 3 wt. % catalyst being particularly preferred.

The adhesive according to the invention may also contain coupling agents. These may be reactive substances capable of undergoing a reaction with the substrate surface, or they may be substances which increase tackiness on the substrate.

Organo-functional silanes such as hydroxy-functional, (meth)acryloxy-functional, mercapto-functional, amino-functional or epoxy-functional silanes are preferably used as coupling agents. These may optionally be incorporated into the polymer network. Examples of mercapto-functional silanes are 3-mercaptopropyltrimethoxysilane or 3-mercaptopropyltrimethoxysilane. Examples of (meth)acryloxy-functional silanes are 3-acryloxypropyltrialkoxy-silane or 3-methacryloxypropyltrialkoxysilane. Examples of epoxy-functional silanes are 3-glycidyloxymethyltrimethoxysilane, 3-glycidyloxymethyltriethoxy-silane or 2-glycidoxyethyltri-methoxysilane. Examples of amino-functional silanes are 3-aminopropylmethyldimethoxysilane, N-(2-aminoethyl)-3-amino-propyltrimethoxysilane (DAMO), N,N-di-(2-aminoethyl)-3-aminopropyl-trimethoxysilane, N-(2-aminoethyl)-N'-(2-aminoethyl)-3-aminopropyltrimethoxy-silane, bis-(triethoxysilylpropyl)-amine, N-(n-butyl)-3-aminopropyltriethoxysilane or mixtures thereof. Correspondingly suitable compounds are likewise the analogous ethoxy or propoxy derivatives, as well as alkyldialkoxy derivatives or derivatives substituted by other alkyl groups instead of the respective propyl group. Condensation products of the above-mentioned aminosilanes may further also be used as a coupling agent component. Such coupling agents are known in the literature.

The above-mentioned coupling agents are preferably used in the binder composition in quantities of between 0.1 and 10 wt. %, preferably of between 0.5 and 5, particularly preferably of between 1 and 4 wt. %.

Tackifying resins, such as modified or unmodified resin acids or esters, polyamines, polyaminoamides, anhydrides and anhydride-containing copolymers or polyepoxide resins are also suitable in small quantities as coupling agents. Typical tackifying resins (tackifiers) such as resin acid derivatives are used in concentrations of between 5 and 20 wt. %, while typical coupling agents such as polyamines, polyaminoamides or resorcinol derivatives are used in the range between 0.1 and 10 wt. %.

Particularly suitable dryers are hydrolyzable silane compounds. Examples thereof are carbamatopropyltrimethoxysilane, alkyltrimethoxysilane, alkyltriethoxysilane, vinyltrimethoxysilane, phenyltrimethoxysilane, tetraethoxy-silane, vinyltriethoxysilane, vinyltriacetoxysilane or isooctyltrimethoxysilane. They have the additional effect that the adhesive exhibits a higher crosslink density. After crosslinking this gives rise to products with a higher modulus or a higher hardness. These characteristics may thus be purposefully influenced by way of the amount used.

Possible fillers or pigments may be selected from a plurality of materials. Examples thereof are chalk, powdered chalk, precipitated and/or pyrogenic silica, zeolites, bentonites, magnesium carbonate, diatomaceous earth, alumina, clay, talc, barytes, titanium oxide, iron oxide, zinc oxide, sand, quartz, flint, mica, aluminum powder, glass powder and other ground mineral substances. Organic fillers may also be used, in particular carbon black, graphite, wood fibers, wood flour, wood shavings, wood pulp, cotton or short fibers, such as glass fiber, glass filament, polyacrylonitrile, carbon fiber, Kevlar fiber or also polyethylene fibers. It may optionally be convenient for at least some of the fillers to be surface pretreated, for example with stearic acid. This may lead to greater compatibility with the binders or to improved moisture stability. Other suitable fillers are hollow spheres with a mineral shell or a plastics shell, such as for example hollow glass spheres. These should preferably have a particle size of 500 αm or less. The total proportion of pigments and fillers in the formulation may vary between 5 and 65 wt. %, in particular between 20 and 60 wt. %.

Although the rheology of the compositions according to the invention may also be brought into the desired range through the selection of the fillers and the quantity ratio of the prepolymers, conventional rheological auxiliaries such as for example pyrogenic silicas, bentones, fibrillated or pulp short fibers or hydrogenated castor oil derivatives may optionally be added in the range between 0.1 and 7 wt. %, preferably between 1 and 3 wt. %.

A preferred embodiment of the adhesive according to the invention may contain:

5 to 50 wt. %, preferably 10 to 40 wt. %, of one or more polyoxyalkylene polymers and/or poly(meth)acrylate polymers with at least one silane group, in particular 2 to 4 silane groups, 0.1 to 20 wt. %, in particular 0.5 to 10 wt. %, of at least one additive solid at room temperature, which does not comprise any group crosslinkable with silane groups, 5 to 65 wt. %, preferably 20 to 60 wt. % of pigments and fillers and 0.01 to 25 wt. % of auxiliary substances and additives, in particular catalysts, coupling agents; stabilizers and/or plasticizers.

All the constituents together should amount to 100 wt. %.

The adhesive according to the invention may be produced by mixing the constituents. It is in this case advantageous for mixing to be performed at an elevated temperature, such that a more readily flowable composition is mixed. It is also possible to produce the composition continuously in an extruder. The sequence of addition and mixing is dependent on the viscosity, consistency and quantity of the individual constituents. The solids should be uniformly dispersed in the liquid constituents. Good mixing must be ensured, so that individual constituents cannot segregate. It may be convenient to dry individual constituents, so as to ensure good storage stability. The mode of production is known in principle, and a person skilled in the art can easily determine it as a function of the raw materials selection.

The uncrosslinked adhesives according to the invention are solid at room temperature (23° C.). Solid at room temperature is understood for this invention to mean that the uncrosslinked adhesive has a viscosity greater than 300 Pa·s. These elevated viscosities of the adhesives are determined by the Physika method, plate-plate measuring head, D=10 sec$^{-1}$. The adhesives according to the invention are stable in practice. In this respect, an applied adhesive (film thickness 1 cm/positioned perpendicularly) should not run of its own accord. The adhesives according to the invention may be softened by heating, for example at temperatures of up to 100° C. The adhesive compositions should conveniently be solvent-free. In this respect, the viscosity for good application should amount to 5 to 200 Pa·s at application temperature, for example at a temperature of between 40 and 100° C. The viscosity at application temperature should preferably amount to 20 to 100 Pa·s. The application viscosity can be influenced by the application temperature. Through selection of the components, an adhesive which is solid at room temperature is obtained, which is of low viscosity at application temperature, cools after application and then rapidly results in high initial strength.

It has been found that the adhesive according to the invention exhibits excellent initial strength. It is known to apply other high-viscosity adhesives, these adhering to the substrates by chemical reaction. However these do not become solid at room temperature as a result of cooling, but rather remain flowable. As a consequence, joined-together parts can still be displaced relative to one another until crosslinking occurs. The adhesive according to the invention exhibits excellent initial strength after cooling to room temperature. The initial strength is determined by a simple test method, in which two substrates are adhesively bonded together, and then fixed perpendicularly. A weight is applied to the one unfixed substrate and the time is determined until the second substrate slips away from the first substrate. While known flowable adhesives slip relative to one another in less than 15 seconds under load, with the adhesive according to the invention no slippage can be observed. Initial strength is improved significantly.

The adhesive according to the invention exhibits good application viscosity at only slightly elevated temperatures. In contrast to known hot-melt adhesives produced on a different chemical basis, it does not have to be heated to over 100° C. Rapid cooling may thus be observed, even with a thick layer, and furthermore the adhesive and the substrate are subjected to a lower thermal load. It may be applied to the substrates at temperatures of 40 to 100° C., in particular of between 50 and 90° C.

The adhesive according to the invention may be used for various kinds of bonds. For example, the adhesive according to the invention is heated and applied as a low-viscosity mass. The adhesive may be applied in the form of a bead. The solid substrates are then correctly assembled. On cooling, the adhesive composition becomes solid again and quickly develops a good initial strength (green strength). The bonded part may then be conveyed onwards, stored or further processed. The adhesive strength is sufficient to prevent the bonded parts from slipping during conventional processing operations.

Another embodiment involves application of the adhesive according to the invention into preformed gaps, grooves or joints. High initial strength is then developed by cooling.

Another possible application is use of the adhesive for adhesively bonding flexible substrates. It is for example possible to apply the adhesive extensively to a rigid or flexible substrate. A second flat substrate, for example a flexible film, is then applied. The two substrates are then pressed together. The substrates are rapidly joined together in slip-resistant manner. When stored under conventional ambient conditions, the adhesive definitively crosslinks by reacting chemically with atmospheric moisture, so building up its hardness, adhesion and resilience.

The adhesives according to the invention may be used for adhesively bonding various substrates. For example, rigid substrates, such as glass, aluminum, metal, ceramics, plastics material or wooden substrates, and optionally also painted surfaces or other coated surfaces may be adhesively bonded together. Furthermore, flexible substrates such as plastics films or metal foils may also be adhesively bonded to one another or with solid substrates. Full-surface bonds may be produced, but it is likewise possible for a strip of the adhesive according to the invention to be applied to the edge of solid substrates, which strip is thus bonded to another substrate over a limited area. The adhesive may then also be used in a thicker layer of up to 15 mm.

The substrates adhesively bonded according to the invention exhibit elevated temperature stability, light stability, and weathering resistance. Even under permanent UV irradiation, for example in photovoltaic installations or the components thereof, no degradation of the polymers of the adhesive can be observed. Adhesion to the substrate is likewise stable. A further advantage is the high flexibility of the adhesive. The adhesive also remains resilient at elevated temperature when the bonded substrates are exposed to outdoor weathering. Possible thermal expansion of the substrates relative to one another does not lead to failure of the adhesive bond.

Through the selection according to the invention of the raw materials, adhesives crosslinkable by way of silane groups are obtained, which exhibit a low application temperature, at the same time develop a high initial strength and thus allow more rapid processing. As a result of the selected crosslinking system, adhesives are obtained which are less questionable from an occupational hygiene standpoint than known NCO-curing systems and which have a good profile of properties.

The bonded parts according to the invention may be used in various fields. For example, they may be used in the building sector, as a construction adhesive for plant parts or for adhesively bonding flexible films to solid substrates.

EXAMPLES

Quantities Stated in Parts

|  | Example 1 | Example 2 | Example 3 | Comparison |
|---|---|---|---|---|
| Silane-modified prepolymer 1 | 33.1 |  |  | Terostat MS 939 (commercially obtainable) |
| Prepolymer 2 |  | 33.1 | 33.1 |  |
| Plasticizer | 9.7 | 9.7 | 8.2 |  |
| Stabilizer | 1.2 | 1.2 | 1.2 |  |
| Rheological auxiliary | 2.0 | 2.0 | 2.0 |  |
| Titanium dioxide | 6.0 | 6.0 | 6.0 |  |
| Chalk | 45.6 | 45.6 | 45.6 |  |
| Light stabilizer | 0.05 |  |  |  |
| Solid additive 1 | 4.5 | 4.5 |  | No solid additive |
| Solid additive 2 |  |  | 1.0 |  |
| Dryer | 1.5 | 1.5 | 1.5 |  |
| Coupling agent | 1.6 | 1.6 | 1.6 |  |
| Catalyst (Sn-based) | 0.8 |  |  |  |
| Viscosity 23° C. (Pa·s) | x[1] | x | x | 200 |
| Viscosity 85° C. (Pa·s) | 126 | 174 | 150 | –/ |
| Shore A | 52 | 74 | 62 | 49 |
| Position tack (300 g) | +[2] | + | + | –[4] |
| Position tack (1000 g) | +/0[3] | +/0[3] | + | – |
| Tensile strength (MPa), 7 d | 2.6 | 3.0 | 2.6 | 3.4 |
| Elongation at break (%), 7 d | 330 | 140 | 180 | 290 |
| Modulus (MPa), 50%, 7 d | 0.9 | 2.0 | 1.6 | 1.0 |

[1] x = not measurable
[2] = no slippage
[3] = slips slowly (>5 min)
[4] = immediate slippage Method of Determining Initial Strength (Position Tack)

An adhesive is applied to a rigid substrate (layer thickness approx. 2 mm). This is then immediately bonded to a second substrate under slight pressure. The bonded area should amount to 100×15 mm. After waiting 5 min., the assembly is suspended perpendicularly by one substrate part. A weight is fixed to the other substrate part and the time until slippage is determined.

300 g Weight:

In the case of liquid/viscous comparison adhesives the second substrate slips off.

With an adhesive bond using the examples according to the invention no slippage of the bonded surface can be observed after a period of 10 min.

1000 g weight: With an adhesive bond using a composition according to Example 3 no slippage is noted. With Examples 1 and 2, slow slippage of the bond may be observed over a period of up to 5 min.

Raw Materials:
Plasticizer: Mesamoll
Light stabilizer: Tinuvin
Dryer: Silane VTMO
Coupling agent: Silane AMMO
Solid additive 1: Arkon P125
Solid additive 2: Dynacoll 7490
Prepolymer 1: MS polymer S303
Prepolymer 2: Geniosil STP-E10

What is claims is:

1. A one-component moisture-curing solid adhesive containing
    a) at least one flowable polyoxyalkylene or polyacrylate prepolymer with at least one hydrolyzable silane group,
    b) at least one inert additive solid at room temperature selected from hydrocarbon resins, polyesters or polyamides with a softening point of 40 to 150° C., and
    c) auxiliary substances and/or additives, wherein
        wherein the adhesive is stable at 23° C., has a viscosity greater than 300 Pa·s at 23° C. and exhibits a viscosity of 5 to 200 Pa·s at 50 to 100° C.

2. The adhesive according to claim 1, wherein the prepolymer comprises at least two hydrolyzable silane groups.

3. The adhesive according to claim 1, wherein trialkoxysilane groups or alkyldialkoxysilane groups are present as the hydrolyzable silane groups.

4. The adhesive according to claim 1, wherein the inert additive solid at room temperature is present in an amount of 0.1 to 20 wt %.

5. The adhesive according to claim 1, wherein the inert additive solid at room temperature exhibits a softening range of +/−15° C.

6. The adhesive according to claim 1, wherein the inert additive solid at room temperature is present in finely divided form.

7. The adhesive according to claim 1, wherein the inert additive solid at room temperature contains no groups reactive with silane groups.

8. The adhesive according to claim 1, wherein the auxiliary substances and/or additives comprises at least one of catalysts, coupling agents, pigments, stabilizers and plasticizers.

9. The adhesive according to claim 8, wherein either no plasticizer is present or at least one plasticizer is present which comprises polar groups.

10. The adhesive according to claim 1, comprising:
    5 to 50 wt. % of the at least one prepolymers with at least one hydrolysable silane group,
    0.1 to 20 wt. % of the at least one additive solid at room temperature,
    0.01 to 25 wt. % of auxiliary substances and/or additives and
    further comprising 5 to 65 wt. % of pigments and fillers, the total being intended to amount to 100 wt %.

* * * * *